July 7, 1970     T. J. HUTCHINSON ET AL     3,519,339

LASER GOGGLES

Filed July 21, 1966

INVENTORS.
THOMAS J. HUTCHINSON
JAMES J. DOLAN

BY *Elliott & Pastoriza*
ATTORNEYS 3,519,339
LASER GOGGLES
Thomas J. Hutchinson, Van Nuys, and James J. Dolan, Woodland Hills, Calif., assignors to Spectrolab, a division of Textron Electronics, Inc., Providence, R.I., a corporation of Delaware
Filed July 21, 1966, Ser. No. 566,961
Int. Cl. G02c 7/10; G02b 5/28, 5/22
U.S. Cl. 351—44                      3 Claims

ABSTRACT OF THE DISCLOSURE

Laser goggles for protecting workers' eyes from laser radiation are made up of front and rear glass plates for respectively absorbing ultraviolet and infrared radiation and including sandwiched therebetween two sets of multi-layer dielectric coatings made up of high and low index of refraction materials. The two sets are separated by a spacer and function to define a narrow pass band for visible light of wave lengths different from the wave length of laser light so that protection is afforded without substantially impairing visibility through the goggles.

---

This invention relates to means for protecting a person's eye or eyes from specific types of laser radiation and more particularly to novel laser goggles.

As is well known to those skilled in the art, laser radiation consists of one or more specific wave lengths of light emitted in the form of a coherent, concentrated beam. In working in the vicinity of lasers, it is practically mandatory that workers wear some type of protective glasses for their eyes.

Heretofore, such protective glasses include radiation absorbing means such as certain types of glass having high absorption cross-sections for various ranges of radiation. However, the absorption characteristics of available glasses are somewhat limited in the band or bands of wave lengths that can be absorbed. Particularly is such the case in certain types of laser devices wherein multiple frequencies are emitted of specific wave lengths in a single beam. While certain ones of these wave lengths may be absorbed, others can pass through the glasses. In this respect, the glasses do not have high efficiency. If the absorption bands are made too wide in an attempt to cover such multiple wave lengths, there is not sufficient visible light passed through the glasses to enable a worker to see what he is doing.

With the foregoing considerations in mind, it is a primary object of the present invention to provide a novel protective means in the form of laser goggles designed to provide the wearer with maximum possible eyesight protection from accidental exposure to laser radiation while still permitting the passage of sufficient visible light to allow the goggles to be worn comfortably for working in normally lighted areas.

More particularly, it is an object to provide laser safety goggles having a greatly increased wave length range in efficiency to the end that multiple spectral lines in laser radiation are substantially blocked from passing to a wearer's eyes as well as other radiation presently capable of absorption by conventional glasses.

Briefly, these and other objects and advantages of this invention are attained by providing goggle glasses constituting a combination of absorption and reflection or filtering means. More particularly, the goggles include for each individual eye at least one piece of glass, and preferably two, having relatively high absorption cross-sections for some of the laser radiation in combination with a multi-layer dielectric filter coating on the one glass, or in the case of two glasses, sandwiched between the two pieces of glass, for reflecting other of the laser radiation. The multi-layer dielectric filter coating functions as a filter to pass only a relatively narrow band of visible light having wave lengths different from the laser radiation or any spectral lines in the laser radiation so that the wearer is provided with sufficient light to enable him to work and yet is provided with maximum protection for his eyes.

A better understanding of the invention will be had by now referring to one embodiment thereof as illustrated in the accompanying drawings, in which.

Figure 1:
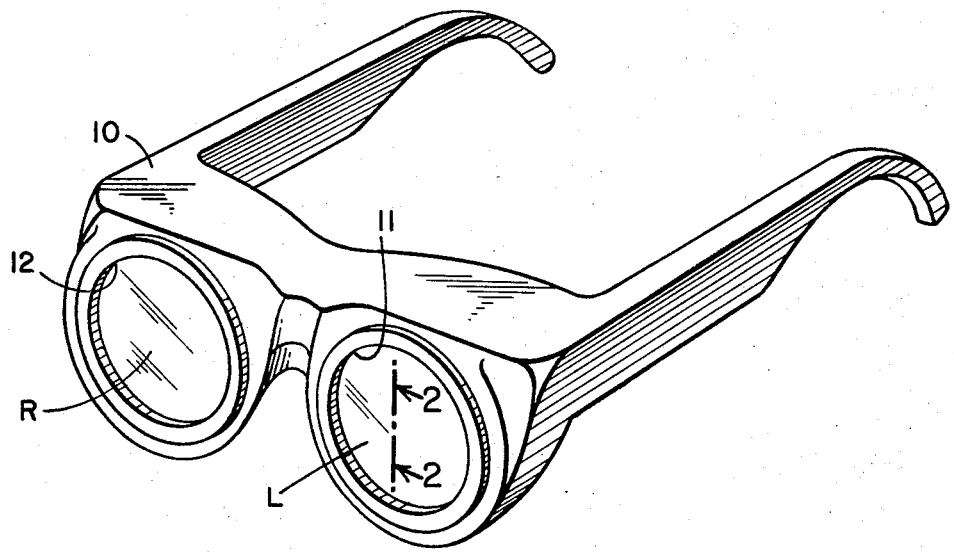
FIG. 1 is a perspective view of the laser goggles of this invention.

Referring first to FIG. 1 there are shown laser goggles comprising a shaped opaque covering 10 which may constitute a plastic covering curved to conform substantially to the curvature of a person's forehead and cheekbone area surrounding the eyes. As shown, this covering includes openings 11 and 12 in its front surface for supporting suitable radiation absorbing and reflecting means designated by the letters L and R for a wearer's left and right eyes, respectively. The protective mediums L and R are identical in construction. A detailed description of one will thus suffice for both.

Figure 2:
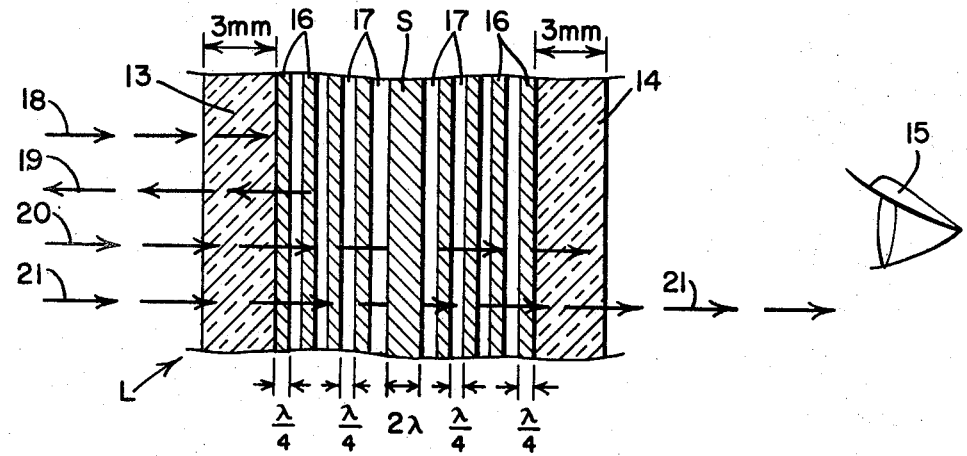
FIG. 2 is a greatly enlarged fragmentary cross-section of a portion of one of the protective glasses incorporated in the goggles of FIG. 1; and, FIG. 3 is a qualitative representation of the optical density of the laser goggles over a range of wave lengths for the composite structure illustrated in FIG. 2.

Thus, referring specifically to the fragmentary cross-section of FIG. 2, the protective medium in the embodiment disclosed includes a front glass 13 having a high absorption cross-section for short wave length radiation in the ultraviolet range. A rear glass 14 in turn is provided and is characterized by a relatively high absorption cross-section for radiation wave lengths in the infrared range. The front glass 13 faces the source of radiation and the rear glass 14 faces the wearer's eye 15.

In combination with the front and rear glasses 13 and 14 is a multi-layer dielectric filter sandwiched between the glasses, as shown. This filter is comprised of alternate layers of high and low index of refraction materials 16 and 17, respectively. These layers are deposited initially with optical thicknesses of one quarter wave length to establish highly efficient reflectivity. After the appropriate number of reflection layers have been deposited, a spacer layer S whose optical thickness is an integral number of half waves is laid down; on this spacer layer there is then deposited a series of reflection layers identical to those laid down initially. The wave length chosen to determine the optical thickness of the half wave spacer layer establishes the location of the pass band. The pass band is restricted to wave lengths different from the wave lengths of any contemplated harmful radiation from the source, such as exist in various laser light emissions.

The protective properties of the structure illustrated in FIG. 2 may be schematically illustrated by considering various types of radiation. For example, radiation indicated by the arrows 18 which is in the ultraviolet range will be absorbed by the front glass 14. Radiation in this range as well as radiation of wave length close to the band pass characteristics of the multi-layer reflection coating will be reflected by the coating as indicated at 19. Other radiation of longer wave length towards the infrared end of the spectrum will be absorbed in the rear glass 15 such as indicated at 20. Radiation of wave length equal or close to the medium wave length of the band pass defined by the multi-layer, however, will pass completely through the structure as shown at 21 and constitutes a visible portion of the light spectrum.

As a specific example of the construction described in FIG. 2, the front glass 14 may comprise glass commercially known as "Schott OG–5" manufactured in Germany and as indicated, may be approximately 3 mm. thick. The rear glass 15 may comprise glass commercially known as "Schott BG–18," also manufactured in Germany and may similarly be approximately 3 mm. thick. The multi-layer coating sandwiched between the front and rear glasses may comprise alternate layers of high index of refraction material, such as zinc sulfide, between which are provided layers of low index of refraction material, such as sodium aluminum fluoride or magnesium fluoride. These layers are alternately evaporated onto the inner surfaces of the front and rear glasses, with the spacer S therebetween. In the embodiment described, eight such layers are provided on each side of the spacer, the initial and end layers 16 and the spacer S comprising the high index of refraction material or zinc sulfide and the low index layers comprising magnesium fluoride.

In FIG. 2, it will be evident that the thickness of the various layers 16 and 17 and spacer S have been enormously exaggerated in order to illustrate them clearly in the drawing.

Figure 3:
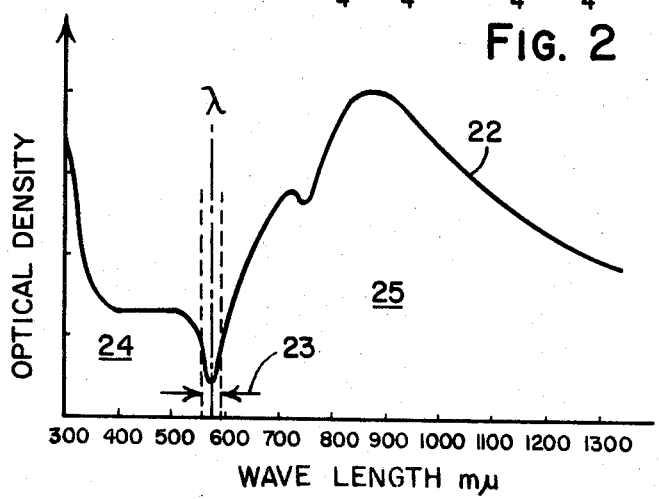

Referring now to FIG. 3, the various wave lengths of light for which the laser goggles are effective will become clearer. In FIG. 3, there is shown a curve 22 qualitatively illustrating the variation in optical density of the structure described in FIG. 2 over a range of wave lengths of radiation. At 23 in FIG. 3, there is indicated a narrow band pass wherein the goggles are relatively transparent to radiation centered about a given wave length; for example, at about 580 millimicrons. This pass band is a consequence of the multi-layer dielectric filter coating made up of the layers 16 and 17 described in FIG. 2 which define relatively steep cutoff characteristics on either side of the band. Thus, from FIG. 3 it will be clear that maximum transmission is effected in the area 23 whereas radiation of wave lengths on either side of this band in the areas designated 24 and 25 is either absorbed or reflected.

It will be clear from FIG. 3, that radiations of wave lengths in the area 24 up to and including 530 millimicrons, which includes ultraviolet radiation from solar radiation simulator sources, second harmonics of various gadolinium and neodymium lasers, argon gas laser radiation, and so fourth, are blocked.

In the area 25, laser radiation lines in the range of 610 to 1300 millimicrons and beyond are also blocked. Thus, protection is afforded against such specific wave length coherent radiations as occur at 611.8 millimicrons, 629.3 millimicrons, 632.8 millimicrons, 640.1 millimicrons, 1084, millimicrons, 1114 millimicrons, 1118 millimicrons, 1139 millimicrons, 1141 millimicrons, 1152 millimicrons, 1160 millimicrons, 1177 millimicrons, 1198 millimicrons, and 1207 millimicrons. Also blocked or suitably absorbed are radiations from a ruby laser including radiations at 694.3 millimicrons, 692.9 millimicrons, 693.4 millimicrons 693.9 millimicrons, 700.9 millimicrons, and 704.1 millimicrons.

In addition to the foregoing wave lengths which are effectively excluded or blocked by the combination of the absorption of the front and rear glasses and the reflection or rejection characteristics of the multi-layer coating, are radiations generally present in the emission of xenon flash tube pumping sources for lasers.

In the absence of the multi-layer coating indicated at 16 and 17 in FIG. 2, the absorption characteristics of the glass alone would not be sufficient to exclude some of the dangerous spectral lines in various different types of laser radiation. However, with the multi-layer coating provided in combination with the absorption characteristics of the front and rear glass, the relatively narrow band pass indicated at 23 in FIG. 3 is defined so that the visible light reaching the wearer's eyes is within a wave length range different from the wave lengths of radiation emitted from laser sources.

From the foregoing description, it will be evident that the present invention has provided novel laser goggles wherein a much broader range of wave lengths is excluded from reaching the wearer's eyes and yet sufficient visible light is passed to enable proper work to be carried on under normal light conditions.

What is claimed is:

1. Laser goggles comprising, in combination: a shaped opaque covering curved to conform substantially to the curvature of a person's forehead and cheekbone area surrounding the eyes and including openings in its front surface in aligment with the eyes; and a radiation absorbing and reflecting means supported in each opening for protecting the eyes from given radiations, each of said means comprising a front glass facing a source of radiation and having a relatively high absorption crosse section to ultraviolet radiation; a rear glass facing the eye and having a relatively high absorption cross section to infrared radiation; and a multi-layer dielectric reflection coating sandwiched between said front glass and rear glass made up of two sets of alternate layers of high and low index of refraction materials, each of one quarter wave length thickness, separated by a spacer of an integral multiple of one half wave length thickness to define a narrow pass band for visible light about a center wave length of 580 millimicrons, wave lengths of laser light of 530 millimicrons and less and of 610 millimicrons and greater being substantially blocked, whereby the eyes are protected from such laser light.

2. Laser goggles according to claim 1, in which said materials comprise zinc sulfide and magnesium fluoride evaporated onto the opposing surfaces of said front and rear glasses in alternate layers, said spacer comprising zinc sulfide.

3. Laser goggles according to claim 2, in which the number of said layers on either side of said spacer is eight.

References Cited

UNITED STATES PATENTS

| 2,700,323 | 1/1955 | Schroder | 350—1 |
| 3,267,807 | 8/1966 | Swope et al. | 351—44 |
| 3,269,267 | 8/1966 | Collins | 2—14 X |

OTHER REFERENCES

Baumeister, P. W.: Notes on Multilayer Optical Filters, 7 Institute of Optics, 68–91, April 1964.

Swope and Koester: Eye Protection Against Lasers, 4 (5), App. Op., 523–526, May 1965.

Goldman and Weber: Protection of Human Eye From Laser Radiation, 122 Ann., N.Y. Acad. Sci., 773–6, May 1965.

DAVID SCHONBERG, Primary Examiner

J. W. LEONARD, Assistant Examiner

U.S. Cl. X.R.

350—1, 166, 316; 351—163